(12) United States Patent
Jiang et al.

(10) Patent No.: US 9,630,850 B2
(45) Date of Patent: *Apr. 25, 2017

(54) METHOD FOR MAKING CARBON NANOTUBE FILM

(71) Applicants: Tsinghua University, Beijing (CN); HON HAI PRECISION INDUSTRY CO., LTD., New Taipei (TW)

(72) Inventors: Kai-Li Jiang, Beijing (CN); Peng Liu, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/737,840

(22) Filed: Jun. 12, 2015

(65) Prior Publication Data

US 2015/0360950 A1 Dec. 17, 2015

(30) Foreign Application Priority Data

Jun. 17, 2014 (CN) .......................... 2014 1 0269296

(51) Int. Cl.
*B32B 3/02* (2006.01)
*C01B 31/02* (2006.01)

(52) U.S. Cl.
CPC ... *C01B 31/0253* (2013.01); *Y10T 428/24893* (2015.01)

(58) Field of Classification Search
CPC .............. C01B 31/022; C01B 31/0206; C01B 31/0253; Y10T 428/24893
See application file for complete search history.

(56) References Cited

U.S. PATENT DOCUMENTS

| 7,988,893 B2* | 8/2011 | Liao ........................ B82Y 30/00 156/292 |
| 8,900,029 B2* | 12/2014 | Liu .......................... H01J 9/025 313/309 |
| 2013/0160933 A1* | 6/2013 | Zhang ..................... D04H 1/40 156/172 |

\* cited by examiner

*Primary Examiner* — Elizabeth Mulvaney
(74) *Attorney, Agent, or Firm* — Steven Reiss

(57) ABSTRACT

A method for making carbon nanotube film includes providing a first patterned carbon nanotube array and a second patterned carbon nanotube array having a predetermined pattern including a rectangle, a first triangle, and a second triangle. A carbon nanotube film is pulled out from a vertex angle of the first triangle of the first patterned carbon nanotube array, until carbon nanotubes of the base side of the second triangle of the first patterned carbon nanotube array are pulled. A carbon nanotube film preform is pulled out from a vertex angle of the first triangle of the second patterned carbon nanotube array and connecting the carbon nanotube film preform to the base side of the second triangle of the first patterned carbon nanotube array. The carbon nanotube film is continuing pulled out.

20 Claims, 12 Drawing Sheets

METHOD FOR MAKING CARBON NANOTUBE FILM

CROSS-REFERENCE TO RELATED APPLICATIONS

This application claims all benefits accruing under 35 U.S.C. §119 from China Patent Application No. 201410269296.7, filed on Jun. 17, 2014, in the China Intellectual Property Office. This application is related to commonly-assigned application entitled, "METHOD FOR MAKING CARBON NANOTUBE FILM", concurrently filed. Disclosures of the above-identified applications are incorporated herein by reference.

FIELD

The present application relates to a method for making carbon nanotube film.

BACKGROUND

Carbon nanotubes are tubules of carbon generally having a length of 5 to 100 micrometers and a diameter of 0.5 to 100 nanometers. Carbon nanotubes can be composed of a number of coaxial cylinders of graphite sheets, and have recently attracted a great deal of attention for use in different applications such as field emitters, gas storage and separation, chemical sensors, and high strength composites. Recently, carbon nanotube films have been fabricated. A carbon nanotube film includes a plurality of carbon nanotube bundles that are joined end to end by van der Waals attractive force. Each of the carbon nanotube bundles includes a plurality of carbon nanotubes substantially parallel to each other. The plurality of carbon nanotube bundles joined end to end by van der Waals attractive force form the continuous carbon nanotube film. After being treated with organic solvent, the carbon nanotube film can be readily used in cables, printed circuit boards, cloths, and other macroscopic applications.

For mass production, the carbon nanotube film should be relatively long. However, the length of the carbon nanotube film is limited by an area of a super-aligned carbon nanotube array from which the carbon nanotube film is derived. In general, a diagonal length of a rectangular super-aligned carbon nanotube array is only about 4 inches. Thus, the length of the carbon nanotube film is correspondingly limited.

What is needed, therefore, is to provide a method for making carbon nanotube film that can overcome the above-described shortcomings.

BRIEF DESCRIPTION OF THE DRAWINGS

Implementations of the present technology will now be described, by way of example only, with reference to the attached figures, wherein.

DETAILED DESCRIPTION

Figure 1:
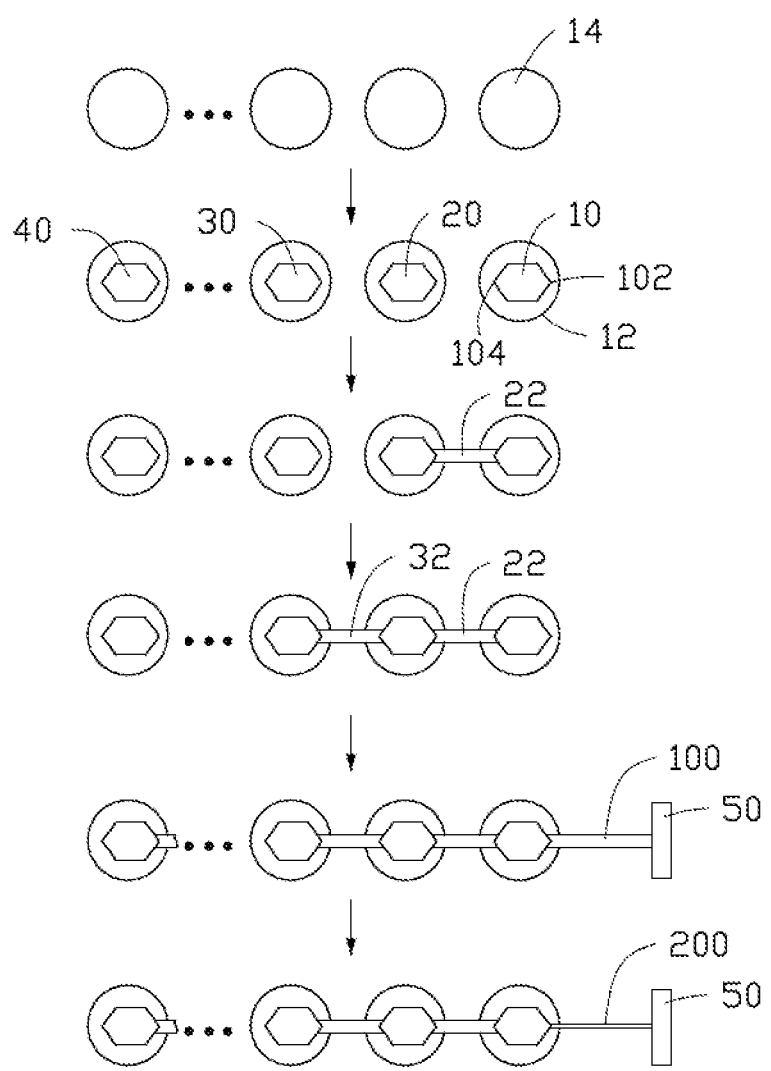
FIG. 1 is a schematic process flow of one embodiment of a method for making a carbon nanotube film.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like.

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 2:
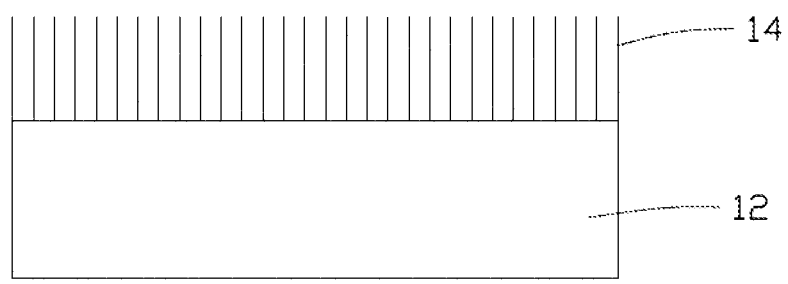
FIG. 2 is a schematic view of one embodiment of a carbon nanotube array.
Figure 3:
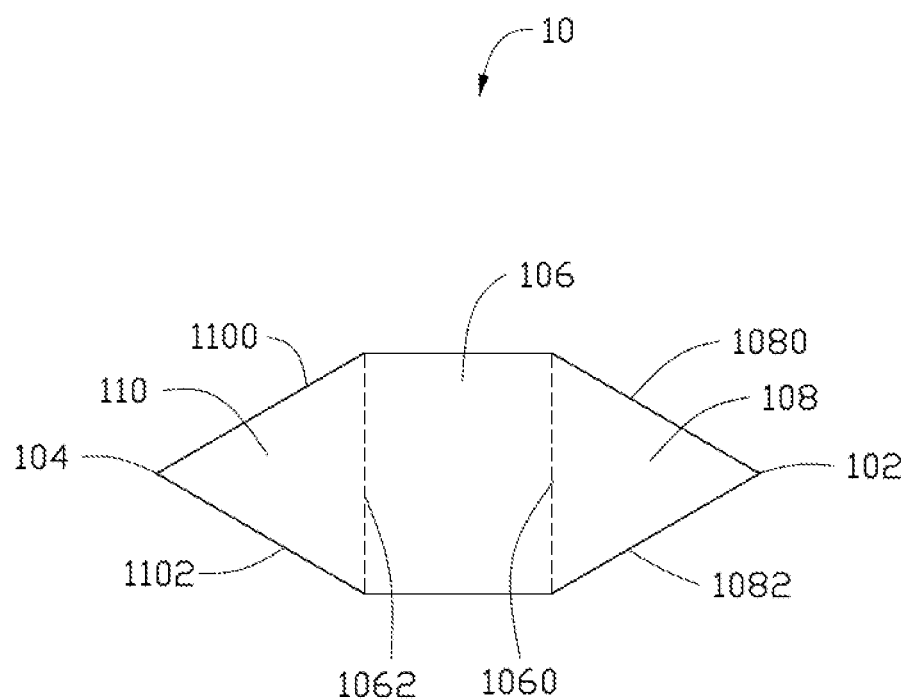
FIG. 3 is a schematic view of one embodiment of a patterned carbon nanotube array.

Referring to FIGS. 1-3, an embodiment of a method for making a carbon nanotube film 100 of one embodiment includes following steps:

S10, providing a plurality of carbon nanotube arrays 14 spaced from each other and arranged along a horizontal direction, wherein the horizontal direction is defined as X direction, and the plurality of carbon nanotube arrays 14 is located in a same plane;

S20, patterning the plurality of carbon nanotube arrays 14 to form a plurality of patterned carbon nanotube arrays successively defined as a first patterned carbon nanotube array 10, a second patterned carbon nanotube array 20, . . . , and the N-th patterned carbon nanotube array 40, the letter N represent the number of the plurality of patterned carbon nanotube arrays, N≥2, wherein each of the plurality of patterned carbon nanotube arrays includes a first end 102 and a second end 104 opposite to the first end 102, and the first end 102 of each of the plurality of patterned carbon nanotube arrays is close to the second end 104 of the adjacent patterned carbon nanotube array;

S30, pulling out a second carbon nanotube film preform 22 from the first end 102 of the second patterned carbon nanotube array 20, and connecting the second carbon nanotube film preform 22 to the second end 104 of the first patterned carbon nanotube array 10;

S40, pulling out a third carbon nanotube film preform 32 from the first end 102 of the third patterned carbon nanotube array 30, and connecting the third carbon nanotube film preform 32 to the second end 104 of the second patterned carbon nanotube array 20;

S50, pulling out a plurality of carbon nanotube film preforms from the second patterned carbon nanotube array 20 to the N-th patterned carbon nanotube array 40 and connecting the plurality of carbon nanotube film preforms to adjacent patterned carbon nanotube arrays by repeating steps (S30) and (S40) as often as desired; and S60, pulling out a carbon nanotube film 100 from the first end 102 of the first pattern carbon nanotube array 10, wherein the pulling direction is along the X direction.

In the step (S10), the plurality of carbon nanotube arrays 14 is spaced from each other and located in the same plane. The carbon nanotube array 14 is fabricated by a chemical vapor deposition process in one embodiment. The chemical vapor deposition process includes the substeps of:

(S101), providing a substantially flat and smooth substrate 12, wherein the substrate 12 can be a P-type silicon substrate, an N-type silicon substrate, or a silicon substrate having oxide layer disposed thereon. In one embodiment, the substrate 12 is a P-type silicon substrate having a width of about 4 inches;

(S102), forming a catalyst on the surface of the substrate 12, wherein the catalyst can be made of iron, cobalt, nickel, or any combination alloy thereof;

(S103), annealing the substrate 12 with the catalyst at a temperature ranging from about 700° C. to about 900° C. in air for about 30 minutes to about 90 minutes;

(S104), heating the substrate 12 with the catalyst at a temperature ranging from about 500° C. to about 740° C. in a furnace with a protective gas therein; and (S105), supplying a carbon source gas to the furnace for about 5 minutes to about 30 minutes and growing the carbon nanotube array 14 on the substrate 12, wherein the carbon source gas may be hydrocarbon gas, such as ethylene, methane, acetylene, ethane, or any combination thereof.

Each of the plurality of carbon nanotube arrays 14 includes a plurality of carbon nanotubes parallel to each other. The plurality of carbon nanotubes is substantially perpendicular to a surface of the substrate 12. Moreover, the plurality of carbon nanotube arrays 14 formed under the above conditions is essentially free of impurities such as carbonaceous or residual catalyst particles.

In the step (S20), referring to FIG. 3, each of the plurality of patterned carbon nanotube arrays includes a plurality of carbon nanotubes parallel to each other and perpendicular to the surface of the substrate 12. The plurality of carbon nanotubes in each of the plurality of patterned carbon nanotube arrays is arranged and formed a predetermined pattern. Each carbon nanotube includes a top end and a bottom end opposite to the top end, wherein the bottom end of each carbon nanotube is in contact with the surface of the substrate 12, and the top end is away form the surface of the substrate 12. The top ends of the plurality of carbon nanotubes form the predetermined pattern.

The predetermined pattern includes a rectangle 106, a first triangle 108, and a second triangle 110. The first triangle 108 and the second triangle 110 are respectively located on two opposite sides of the rectangle 106. The first triangle 108 and the rectangle 106 share one side, the second triangle 110 and the rectangle 106 share one side. In detail, the rectangle 106 includes a first side 1060 and a second side 1062 opposite to the first side 1060. The first side 1060 and the second side 1062 of the rectangle 106 are perpendicular to X direction. In each patterned carbon nanotube array, the first end 102 is a vertex of the first triangle 108. A third side 1080, a fourth side 1082, and the first side 1060 of the rectangle 106 form the first triangle 108. The first end 102 is a crossover point of the third side 1080 and the fourth side 1082. The second end 104 is a vertex of the second triangle 110. A fifth side 1100, a sixth side 1102, and the second side 1062 of the rectangle 106 form the second triangle 110. The second end 104 is a crossover point of the fifth side 1100 and the sixth side 1102. In one embodiment, the plurality of patterned carbon nanotube arrays has the same structures, dimensions, and predetermined patterns.

A distance between the first end 102 and the first side 1060 is equal to a distance between the second end 104 and the second side 1062. In one embodiment, the first triangle 108 and the second triangle 110 have the same dimension. The first side 1060 is designed as a base side of the first triangle 108, and the second side 1062 is designed as a base side of the second triangle 110. A height of the first triangle 108 in the X direction is equal to a height of the second triangle 110 in the X direction.

The first triangle 108 and the second triangle 110 can be formed a parallelogram. The first triangle 108 and the second triangle 110 can be simultaneously an acute triangle, an obtuse angled triangle, or a right triangle.

Referring to FIG. 3, both the first triangle 108 and the second triangle 110 are acute triangles. The third side 1080 of the first triangle 108 is parallel to the sixth side 1102 of the second triangle 110. The fourth side 1082 of the first triangle 108 is parallel to the fifth side 1100 of the second triangle 110. In one embodiment, both the first triangle 108 and the second triangle 110 are isosceles triangles. In one embodiment, both the first triangle 108 and the second triangle 110 are equilateral triangles.

Figure 4:
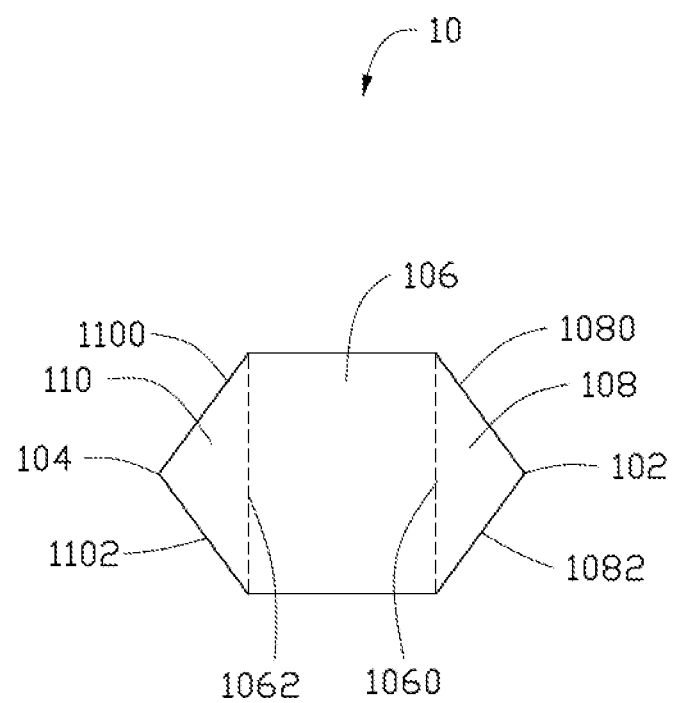
FIG. 4 is a schematic view of one embodiment of another patterned carbon nanotube array.

Referring to FIG. 4, both the first triangle 108 and the second triangle 110 are obtuse angled triangles. The third side 1080 of the first triangle 108 is parallel to the sixth side 1102 of the second triangle 110. The fourth side 1082 of the first triangle 108 is parallel to the fifth side 1100 of the second triangle 110. In the first triangle 108, the third side 1080 and the fourth side 1082 form an obtuse angle; and in the second triangle 110, the fifth side 1100 and the sixth side 1102 form an obtuse angle.

Figure 5:
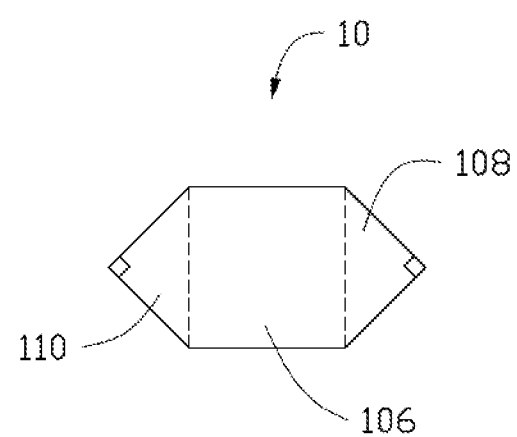
FIG. 5 is a schematic view of one embodiment of yet another patterned carbon nanotube array.
Figure 6:
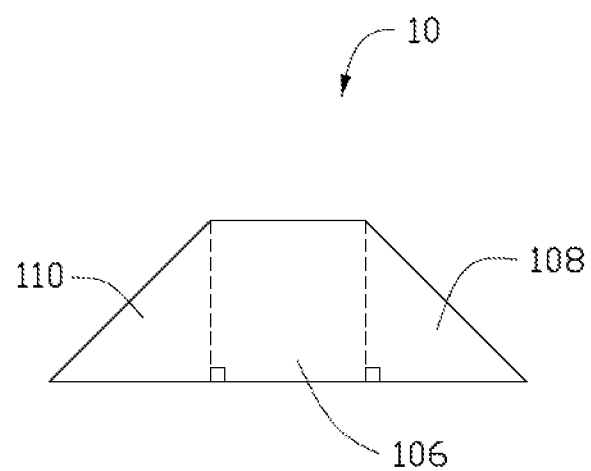
FIG. 6 is a schematic view of one embodiment of yet another patterned carbon nanotube array.

Referring to FIGS. 5 and 6, both the first triangle 108 and the second triangle 110 are right triangles. In FIG. 5, the first side 1060 of the rectangle 106 is the hypotenuse of the first triangle 108, and the second side 1062 of the rectangle 106 is the hypotenuse of the second triangle 110. In one embodiment, the first triangle 108 and the second triangle 110 are isosceles tight triangles. In FIG. 6, the first side 1060 of the rectangle 106 is a leg of the first triangle 108, the second side 1062 of the rectangle 106 is a leg of the second triangle 110, and a line between the first end 102 and a second end 104 is parallel to the X direction.

Methods for patterning the plurality of carbon nanotube arrays 14 can be selected according to need. In one embodiment, the plurality of carbon nanotube arrays 14 are patterned by irradiating the plurality of carbon nanotube arrays 14 with a laser beam.

The laser beam irradiates the plurality of carbon nanotube arrays 14 along a predetermined path on the plurality of carbon nanotube arrays 14 thereby to cut predetermined pattern within the path in each of the plurality of carbon nanotube arrays 14. The laser beam has a power of about 3.6 to about 12 watts and a moving speed of about 1 to about 1000 mm/s. The laser beam can be a YAG laser. The laser beam has a wavelength of 1.06 microns and a beam spot diameter of 20 microns. In one embodiment, the moving speed of the laser beam is in a range from about 10 mm/s to about 90 mm/s. The laser beam will not damage the substrate 12.

It is to be understood, patterning the plurality of carbon nanotube arrays 14 with the laser beam can also be carried out by fixing the laser beam and moving the plurality of carbon nanotube arrays 14 by a computer program along the predetermined portion.

In the step (S30), the second carbon nanotube film preform 22 can be pulled/drawn by the following substeps:

(S31), selecting multiple carbon nanotubes of the second patterned carbon nanotube array 20 by using a tool 50; and (S32), pulling the carbon nanotubes at an even/uniform speed to second carbon nanotube film preform 22.

In the step (S31), the tool 50 can be an adhesive tape, plier, tweezer, or another tool allowing multiple carbon nanotubes to be gripped and pulled simultaneously.

In the step (S32), a pulling direction is arbitrary. In one embodiment, the pulling direction is substantially perpendicular to a growing direction of plurality of carbon nanotube arrays 14.

During the pulling process, as the initial carbon nanotubes are drawn out, other carbon nanotubes are also drawn out end-to-end due to the van der Waals attractive force between ends of adjacent carbon nanotube. This process of drawing ensures that a continuous, uniform second carbon nanotube film preform 22 having a predetermined width can be formed.

The second carbon nanotube film preform 22 is a substantially pure structure of the carbon nanotubes, with few impurities. The carbon nanotubes of the second carbon nanotube film preform 22 have low specific surface area, and are combined by van der Waals attractive force. Thus, the second carbon nanotube film preform 22 has viscosity and can be directly connected to the second end 104 of the first patterned carbon nanotube array 10 without an adhesive. It is to be understood that the second carbon nanotube film preform 22 can be connected to the second end 104 of the first patterned carbon nanotube array 10 by an adhesive.

The second carbon nanotube film preform 22 can be connected to the second side 1062 of the rectangle 106 of the first patterned carbon nanotube array 10. In one embodiment, the second carbon nanotube film preform 22 is connected to middle point of the second side 1062 of the rectangle 106 of the first patterned carbon nanotube array 10. In detail, the second carbon nanotube film preform 22 has a first end point 222 and a second end point 224 opposite to the first end point 222. The first end point 222 is connected to the first end 102 of the second patterned carbon nanotube array 20. The second end point 224 is connected to the second side 1062 of the rectangle 106 of the first patterned carbon nanotube array 10.

The steps (S40), (S50) and (S30) have the same process.

In the step (S60), the tool 50 selects some carbon nanotubes of the first patterned carbon nanotube array 10 having a determined width, and then pulled away from the first patterned carbon nanotube array 10 at an even/uniform speed to make the carbon nanotubes separate from the first patterned carbon nanotube array 10. The pulling direction can be substantially perpendicular to the growing direction of the plurality of carbon nanotube arrays 14.

During the extracting process, when the carbon nanotubes of the second side 1062 of the rectangle 106 or second end 104 of the first patterned carbon nanotube array 10 is pulled, the carbon nanotubes of the second patterned carbon nanotube array 20 begin to pull away from the second patterned carbon nanotube array 20, because the second carbon nanotube film preform 22 connects to the carbon nanotubes of the second side 1062 of the rectangle 106 or second end 104 of the first patterned carbon nanotube array 10. In this way, until the carbon nanotubes of the N-th patterned carbon nanotube array 40 are pulled.

During the extracting process, when ends of the carbon nanotubes of the first patterned carbon nanotube array 10 is drawn out, other carbon nanotubes are also drawn out in a manner that ends of a carbon nanotube is connected with ends of adjacent carbon nanotubes, by the help of the van der Waals attractive force between the ends of carbon nanotubes. This characteristic of the carbon nanotubes ensures that a continuous carbon nanotube film 100 having a width can be formed.

The carbon nanotube film 100 can comprise or consist of a plurality of carbon nanotubes extending along a same direction. The plurality of carbon nanotubes is parallel to a surface of the carbon nanotube film 100 and extends along the pulling direction. Along the extending direction of the plurality of carbon nanotubes, each carbon nanotube is joined to adjacent carbon nanotubes end to end by van der Waals attractive force therebetween, whereby the carbon nanotube film 100 is capable of being free-standing structure.

In the process of forming the carbon nanotube film 100, the number of the carbon nanotubes of the carbon nanotube film 100 remains unchanged. In the carbon nanotube film 100, the number of the carbon nanotubes in each cross section of the carbon nanotube film 100 perpendicular to the pulling direction remains unchanged. Specific analysis is as follows.

Figure 7:
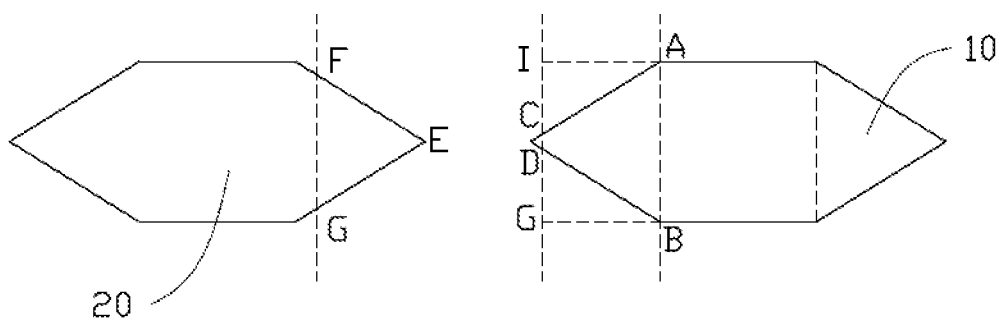
FIG. 7 is a schematic view of one embodiment of a second carbon nanotube film preform without connecting to a first patterned carbon nanotube array.

FIG. 7 is a schematic view of one embodiment of the second carbon nanotube film preform 22 without connecting to the first patterned carbon nanotube array 10. The width of the second carbon nanotube film preform 22 or the width of the carbon nanotube film 100 is related to the area of the plurality of patterned carbon nanotube arrays. The number of the carbon nanotubes, in the second carbon nanotube film preform 22 or the carbon nanotube film 100, is related to the area of the plurality of patterned carbon nanotube arrays. In the process of pulling the carbon nanotubes, the pulling speed is even/uniform. When the carbon nanotubes of the second side 1062 of the rectangle 106 continue being pulled, the number of the carbon nanotubes of the carbon nanotube film 100 will reduce because the area of first patterned carbon nanotube array 10 reduces. During the time from 0 to T, the carbon nanotubes of the second side 1062 of the rectangle 106 are pulled until the carbon nanotubes of the line CD of the first patterned carbon nanotube array 10.

During the time from 0 to T, the area of the first patterned carbon nanotube array 10 reduced is equal to total area of triangle IAC and triangle BGD. And during the time from 0 to T, the carbon nanotubes of the first end 102 of the second patterned carbon nanotube array 20 are pulled until the carbon nanotubes of the line FG of the second patterned carbon nanotube array 20 are pulled.

In each patterned carbon nanotube array, the first triangle 108 and the second triangle 110 can form a parallelogram, thus ∠E of triangle EFG=∠A of triangle IAC+∠B of triangle BGD. In the condition of even/uniform speed, the area of the triangle EFG is equal to total areas of the triangle IAC and the triangle BGD.

Therefore, when the second carbon nanotube film preform 22 connects to the carbon nanotubes of the second side 1062 of the rectangle 106 of the first patterned carbon nanotube array 10, the reduced carbon nanotubes of the carbon nanotube film 100 can be compensated. The rest may be deduced by above analogy, when each carbon nanotube film preform pulled from each patterned carbon nanotube array connects to the second side 1062 of the rectangle 106 of previous patterned carbon nanotube array, the number of the carbon nanotubes of the carbon nanotube film 100 remains unchanged in whole extracting process.

The method for making the carbon nanotube film 100 further includes treating the carbon nanotube film 100 to a carbon nanotube wire 200.

Figure 8:
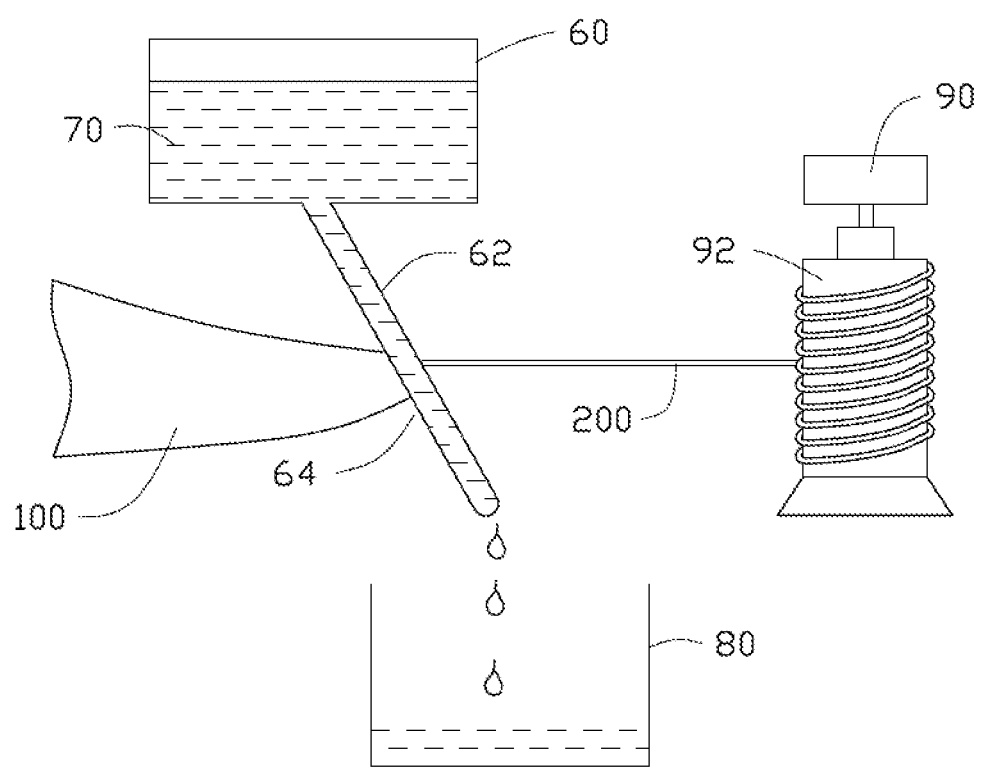
FIG. 8 is a schematic view of one embodiment of treating the carbon nanotube film of FIG. 1 with organic solvent.

The carbon nanotube film 100 can be treated by an organic solvent 70 to form the carbon nanotube wire 200. The carbon nanotube wire 200 is an untwisted carbon nanotube wire 200. A method for treating carbon nanotube film 100 with the organic solvent 70 can be selected according to need. In one embodiment, referring to FIG. 8, a first container 60 located on upside of the carbon nanotube film 100 contains the organic solvent 70 for shrinking the carbon nanotube film 100. The organic solvent 70 can be ethanol, methanol, acetone, dichloroethane, chloroform, or the combinations thereof. In one embodiment, the organic solvent 70 is ethanol. The first container 60 includes a tube 62 on its sidewall. The tube 62 has a through hole 64 defined therein for allowing the carbon nanotube film 100 pass therethrough. The first container 60 is configured for supplying the organic solvent 70 to the tube 62. A second container 80 is placed below the through hole 64 of the tube 62 for collecting leaking organic solvent 70.

The carbon nanotube film 100 is passed through the through hole 64 of the tube 62 continuously and soaked in the organic solvent 70. Thus the carbon nanotube film 100 is shrunk into the carbon nanotube wire 200 with a diameter of 20-30 microns under the action of surface tension of the organic solvent 70.

The carbon nanotube wire 200 includes a plurality of carbon nanotubes packed closely together. The plurality of carbon nanotubes extends along an axial of the carbon nanotube wire 200. In the extending direction of carbon nanotubes, the plurality of carbon nanotubes are joined end to end by van der Waals attractive force. The ratio of surface area to volume of the carbon nanotube wire 200 is low and the carbon nanotube wire 200 thus has non-stick properties.

Figure 9:
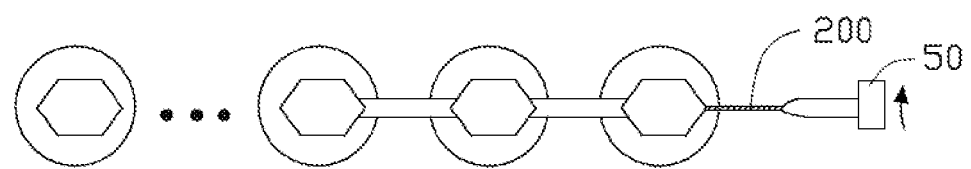
FIG. 9 is a schematic view of one embodiment of twisting the carbon nanotube film of FIG. 1.

Referring to FIG. 9, the carbon nanotube film 100 can be twisted into the carbon nanotube wire 200 that is a twisted carbon nanotube wire 200. In the process of twisting carbon nanotube film 100, carbon nanotube film 100 is still being drawn and joined with the carbon nanotube array 14. In the length direction, one end of the carbon nanotube film 100 is connected with the carbon nanotube array 14 by van der Waals attractive force, other end is held by the tool 50. The substrate 12 can be fixed, while the tool 50 is rotated, the carbon nanotube film 100 is twisted into the carbon nanotube wire 200. The rotation direction is substantially perpendicular to the length direction of the carbon nanotube film 100. The tool 50 can be fixed on a rotating machine to pull and rotate simultaneously.

While rotating the tool 50, a pulling force is still applied on the carbon nanotube film 100, and the plurality of carbon nanotube is twisted. Further, by pulling the tool 50, more and more carbon nanotubes can be drawn from the patterned carbon nanotube array to extend the length of the carbon nanotube film 100. In one embodiment, the value of twist force is in a range from about 0.00005 Newton to about 0.001 Newton.

The carbon nanotube wire 200 formed by twisting the carbon nanotube film 100 includes a plurality of carbon nanotubes helically oriented around an axial direction of the carbon nanotube wire 200. Therefore, the carbon nanotube wire 200 formed by twisting the carbon nanotube film 100 has a larger mechanical strength.

The carbon nanotube wire 200 can be coiled onto a bobbin 92 with an electromotor 90 or by hand.

The number of carbon nanotubes of the carbon nanotube film 100 remains unchanged in pulling out the carbon nanotube film 100. When the carbon nanotube film 100 is treated into the carbon nanotube wire 200, the number of the carbon nanotubes of the carbon nanotube wire 200 is uniform. The carbon nanotube wire 200 has uniform quantity of carbon nanotubes. Thus, the carbon nanotube wire 200 has a uniform diameter, improving mechanical properties of the carbon nanotube wire 200.

An embodiment of the method for making the carbon nanotube film 100 is shown where the carbon nanotube film 100 is pulling out from a first carbon nanotube structure preform 300.

Figure 10:
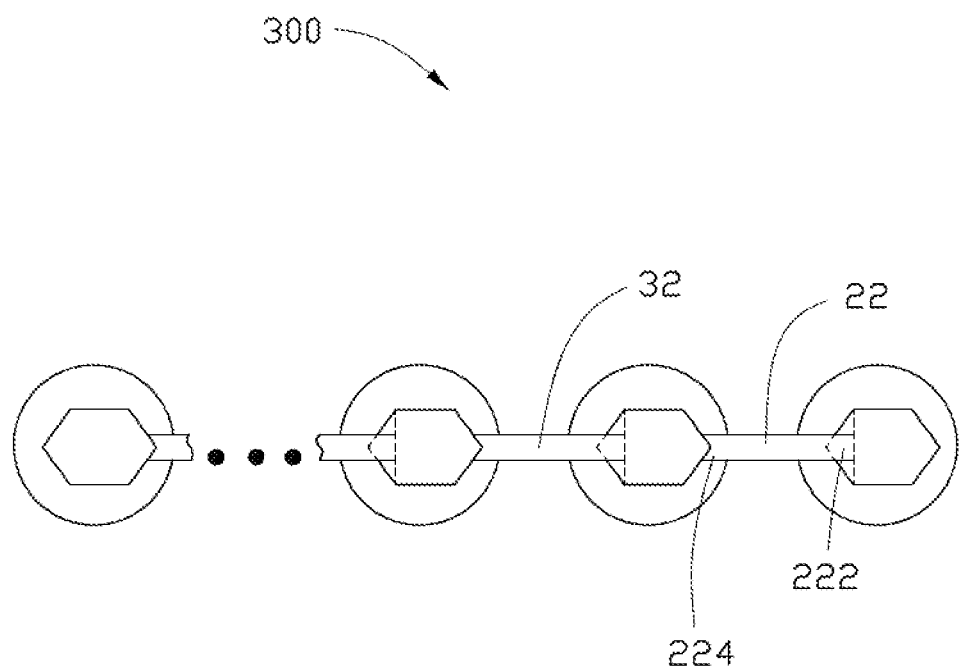
FIG. 10 is a schematic view of another embodiment of a first carbon nanotube structure preform.

Referring to FIG. 10, the first carbon nanotube structure preform 300 includes N patterned carbon nanotube arrays and N−1 carbon nanotube film preforms. The N patterned carbon nanotube arrays are spaced from each other and arranged along the X direction, N≥2. Each patterned carbon nanotube array includes the substrate 12 and a plurality of carbon nanotubes substantially parallel to each other and substantially perpendicular to the surface of the substrate 12. The plurality of carbon nanotubes forms the predetermined pattern. The predetermined pattern includes the rectangle 106, the first triangle 108, and the second triangle 110. The first triangle 108 and the second triangle 110 are respectively located on two opposite sides of the rectangle 106. The rectangle 106 includes a first side 1060 and a second side 1062 opposite to the first side 1060. A base side of the first triangle 108 and the rectangle 106 share the first side 1060, a base of the second triangle 110 and the rectangle 106 share the second side 1062. The first side 1060 and the second side 1062 of the rectangle 106 are perpendicular to the X direction. The height of the first triangle 108 in the X direction is equal to the height of the second triangle 110 in the X direction.

Each carbon nanotube film preform is located between two adjacent patterned carbon nanotube arrays and pulled out from a vertex angle of the first triangle 108 of N−1-th patterned carbon nanotube arrays. Each carbon nanotube film preform includes the first end point 222 and the second end point 224 opposite to the first end point 222. The first end point 222 is connected to the base side of the second triangle 110 of the N-th patterned carbon nanotube array. The second end point 224 is connected to the vertex angle of the first triangle 108 of N−1-th patterned carbon nanotube arrays. The vertex angle of the first triangle 108 is equal to the vertex angle of second triangle 110. The vertex angle of the first triangle 108 is opposite to the base side of the first triangle 108. The vertex angle of the second triangle 110 is opposite to the base side of the second triangle 110. When both the first triangle 108 and the second triangle 110 are obtuse angled triangles, the vertex angle of the first triangle 108 and the vertex angle of the second triangle 110 are greater than 90 degrees.

The N−1 carbon nanotube film preforms are suspended. The N−1 carbon nanotube film preforms include the plurality of carbon nanotubes joined end to end by van der Waals attractive force and extending along the X direction.

Figure 11:
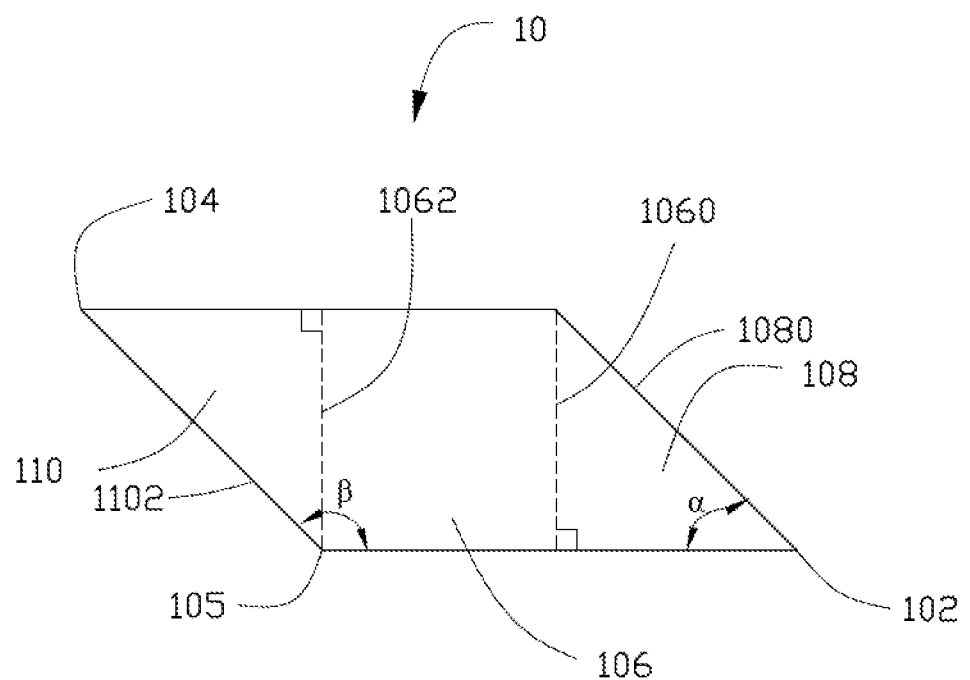
FIG. 11 is a schematic view of another embodiment of a patterned carbon nanotube array.

Referring to FIG. 11, an embodiment of the method for making the carbon nanotube film 100 is shown where the predetermined pattern is a parallelogram including the first triangle 108, the second triangle 110, and the rectangle 106, wherein the first triangle 108 and the second triangle 110 are right triangles. The first side 1060 of the rectangle 106 is a leg of the first triangle 108, the second side 1062 of the rectangle 106 is a leg of the second triangle 110. The parallelogram includes the first end 102, the second end 104, and a third end 105. The first end 102 and the second end 104 forms a diagonal line of the parallelogram. A line between the first end 102 and the third end 105 is parallel to the X direction. A line between the first end 102 and a second end 104 is not parallel to the X direction. The second carbon nanotube film preform 22 connects to the carbon nanotubes of the third end 105 of the parallelogram of the first patterned carbon nanotube array 10. In this way, each carbon nanotube film preform pulled from each patterned carbon nanotube array connects to the third end 105 of the parallelogram of previous patterned carbon nanotube array.

When the carbon nanotube film 100 is continually pulled out from the first end 102 of the first patterned carbon nanotube array 10 along the X direction, the number of the carbon nanotubes, in each cross section of the carbon nanotube film 100 perpendicular to the pulling direction and the width of the carbon nanotube film 100, remain substantially unchanged. It is understood that there may be some variations due to manufacturing. The carbon nanotube film 100 has substantially uniform width and quantity of carbon nanotubes.

An embodiment of the method for making the carbon nanotube film 100 is shown where the carbon nanotube film 100 is pulled out from a second carbon nanotube structure preform 400.

Figure 12:
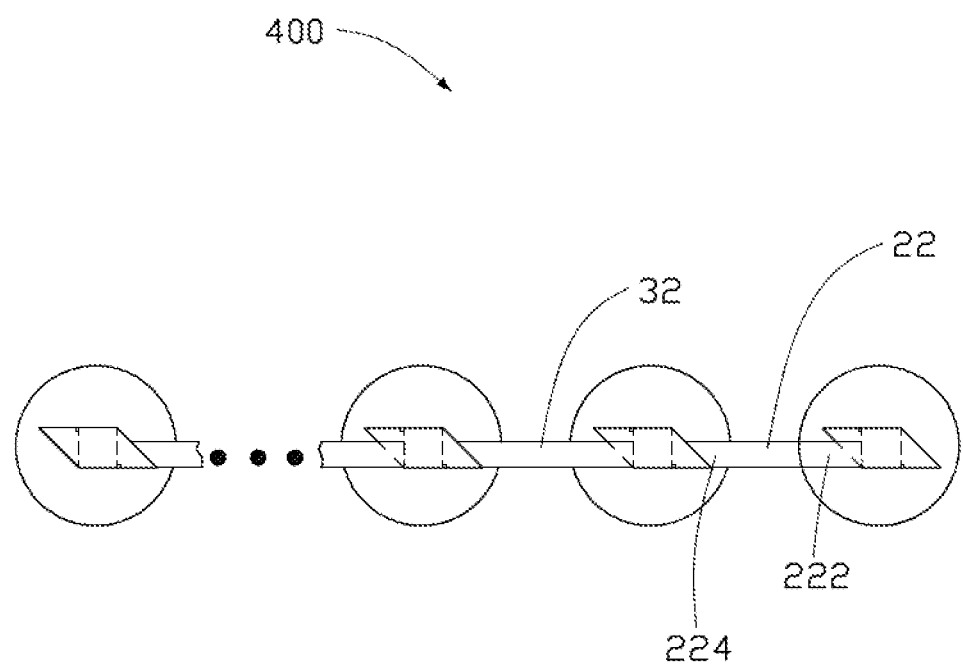
FIG. 12 is a schematic view of yet another embodiment of a second carbon nanotube structure preform.

Referring to FIG. 12, the second carbon nanotube structure preform 400 includes N patterned carbon nanotube arrays and N−1 carbon nanotube film preforms. The N patterned carbon nanotube arrays are spaced from each other and arranged along the X direction, N≥2. Each patterned carbon nanotube array includes the substrate 12 and a plurality of carbon nanotubes substantially parallel to each other and substantially perpendicular to the surface of the substrate 12. The plurality of carbon nanotubes forms the predetermined pattern. The predetermined pattern includes the rectangle 106, the first triangle 108, and the second triangle 110 forming a parallelogram. The first triangle 108 and the second triangle 110 are respectively located on two opposite sides of the rectangle 106. The rectangle 106 includes a first side 1060 and a second side 1062 opposite to the first side 1060. The first triangle 108 and the rectangle 106 share the first side 1060, the second triangle 110 and the rectangle 106 share the second side 1062. The first side 1060 and the second side 1062 of the rectangle 106 are perpendicular to the X direction. The parallelogram includes the first end 102, the second end 104, and the third end 105. The first end 102 and the second end 104 form the diagonal line of the parallelogram, wherein an angle between the diagonal line of the parallelogram and the X direction is about 45 degrees. The line between the first end 102 and the third end 105 is parallel to the X direction.

Each carbon nanotube film preform is located between two adjacent patterned carbon nanotube arrays and pulled out from a vertex angle of the first triangle 108 of N−1-th patterned carbon nanotube arrays. Each carbon nanotube film preform includes the first end point 222 and the second end point 224 opposite to the first end point 222. The first end point 222 is connected to the third end 105 of the parallelogram of the N-th patterned carbon nanotube array. The second end point 224 is connected to the first end 102 of the rectangle 106 of N−1-th patterned carbon nanotube arrays. The N−1 carbon nanotube film preforms are suspended. The N−1 carbon nanotube film preforms include the plurality of carbon nanotubes joined end to end by van der Waals attractive force and extending along the X direction.

It is to be understood, preferring to FIG. 11, the parallelogram includes two seventh sides parallel to each other, the third side 1080, and the sixth side 1102, wherein the third side 1080 and the sixth side 1102 are parallel to each other. The third sides 1080 of adjacent patterned carbon nanotube arrays are parallel to each other. The two seventh sides are parallel to the X direction. The parallelogram includes an acute angle defined as a and an obtuse angle defined as β. The acute angle of the parallelogram of each of the plurality of patterned carbon nanotube arrays is close to the obtuse angle of the parallelogram of the adjacent patterned carbon nanotube array. Each carbon nanotube film preform is located between two adjacent patterned carbon nanotube arrays. Each carbon nanotube film preform is directly pulled out from a acute angle vertex 102 of the parallelogram of each of the plurality of patterned carbon nanotube arrays. The first end point 222 of each carbon nanotube film preform is connected to an obtuse angle vertex 105 of the parallelogram of each of the plurality of patterned carbon nanotube arrays. The second end point 224 of each carbon nanotube film preform is connected to the acute angle vertex 102 of the parallelogram of each of the plurality of patterned carbon nanotube arrays.

In summary, a plurality of patterned carbon nanotube arrays connected to each other, implementing continuous production of the carbon nanotube film. Moreover, adjusting the shapes of the patterned carbon nanotube arrays can make the number of the carbon nanotubes of the carbon nanotube film remain unchanged, improving mechanical strength of the carbon nanotube film. Furthermore, adjusting the shapes of the patterned carbon nanotube arrays can also make the width of the carbon nanotube film remain unchanged.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

Additionally, it is also to be understood that the above description and the claims drawn to a method may include some indication in reference to certain steps. However, the indication used is only to be viewed for identification purposes and not as a suggestion as to an order for the steps.

What is claimed is:

1. A method for making carbon nanotube film, comprising the following steps:

providing two carbon nanotube arrays spaced from each other and arranged along an X direction, wherein the two carbon nanotube arrays comprises a plurality of carbon nanotubes;

patterning the two carbon nanotube arrays to form two patterned carbon nanotube arrays successively defined as a first patterned carbon nanotube array, a second patterned carbon nanotube array; the plurality of carbon nanotubes of each of the two patterned carbon nanotube arrays form a predetermined pattern comprising a rectangle, a first triangle, and a second triangle; the first triangle and the second triangle are respectively located on two opposite sides of the rectangle, wherein the two opposite sides of the rectangle are perpendicular to the X direction; a first triangle base side and the rectangle share a first side, a second triangle base side and the rectangle share a second side opposite to the first side; and a distance between a first triangle vertex and the first triangle base side is equal to a distance between a second triangle vertex and the second triangle base side;

pulling out a first carbon nanotube film preform from the first triangle vertex angle in the first patterned carbon nanotube array, until carbon nanotubes of the second triangle base side in the first patterned carbon nanotube array are pulled, wherein the first triangle vertex angle is opposite to the first triangle base side;

pulling out a second carbon nanotube film preform from a first triangle vertex angle of the second patterned carbon nanotube array and connecting the carbon nanotube film preform to the second triangle base side in the first patterned carbon nanotube array, wherein the second triangle vertex angle is opposite to the second triangle base side; and pulling out the first carbon nanotube film preform, and a pulling direction is parallel to the X direction.

2. The method of claim 1, wherein the number of the plurality of carbon nanotubes in the carbon nanotube film remains substantially unchanged in a process of pulling the carbon nanotube film.

3. The method of claim 1, wherein the first triangle vertex angle is equal to the second triangle vertex angle.

4. The method of claim 1, wherein the first triangle and the second triangle are obtuse triangles, and the first triangle vertex angle and the second triangle vertex angle are greater than 90 degrees.

5. The method of claim 1, wherein the first triangle and the second triangle are equilateral triangles.

6. The method of claim 1, wherein the carbon nanotube film preform comprises the plurality of carbon nanotubes joined end to end by van der Waals attractive force and extending along the X direction.

7. A carbon nanotube structure preform, comprising:

a plurality of patterned carbon nanotube arrays spaced from each other and arranged along a X direction, N≥2; each of the plurality of patterned carbon nanotube arrays comprises a plurality of carbon nanotubes substantially parallel to each other; the plurality of carbon nanotubes form a predetermined pattern comprising a rectangle, a first triangle, and a second triangle; the first triangle and the second triangle are respectively located on two opposite sides of the rectangle, wherein the two opposite sides of the rectangle are perpendicular to the X direction; a first triangle base side and the rectangle share a first side, a second triangle base side and the rectangle share a second side opposite to the first side; and a distance between a first triangle vertex and the first triangle base side is equal to a distance between a second triangle vertex and the second triangle base side; and a plurality of carbon nanotube film preforms located between two adjacent patterned carbon nanotube arrays, each of the plurality of carbon nanotube film preforms directly pulled out from each of the plurality of patterned carbon nanotube arrays comprises a first end and a second end opposite to the first end; the first end of the each of the plurality of carbon nanotube film preforms is connected to the second triangle base side, and the second end of the each of the plurality of carbon nanotube film preforms is connected to the first triangle vertex angle.

8. The carbon nanotube structure preform of claim 7, wherein each of the plurality of patterned carbon nanotube arrays further comprises a substrate, and the plurality of carbon nanotubes is substantially perpendicular to a surface of the substrate.

9. The carbon nanotube structure preform of claim 7, wherein the plurality of carbon nanotube film preforms is suspended.

10. The carbon nanotube structure preform of claim 7, wherein the first triangle vertex angle is equal to the second triangle vertex angle.

11. The carbon nanotube structure preform of claim 7, wherein the first triangle and the second triangle are obtuse triangles, the first triangle vertex angle and the second triangle vertex angle are greater than 90 degrees.

12. The carbon nanotube structure preform of claim 7, wherein the first triangle and the second triangle are equilateral triangles.

13. The carbon nanotube structure preform of claim 7, wherein the plurality of carbon nanotube film preforms comprises the plurality of carbon nanotubes joined end to end by van der Waals attractive force and extending along the X direction.

14. The carbon nanotube structure preform of claim 7, wherein the plurality of patterned carbon nanotube arrays has the same structure and size.

15. A method for making carbon nanotube film, comprising the following steps:

providing a carbon nanotube structure preform, comprising:

a plurality of patterned carbon nanotube arrays spaced from each other and arranged along a X direction, N≥2; each of the plurality of patterned carbon nanotube arrays comprises a plurality of carbon nanotubes substantially parallel to each other; the plurality of carbon nanotubes form a predetermined pattern comprising a rectangle, a first triangle, and a second triangle; the first triangle and the second triangle are respectively located on two opposite sides of the rectangle, wherein the two opposite sides of the rectangle are perpendicular to the X direction; a first triangle base side and the rectangle share a first side, a second triangle base side and the rectangle share a second side, the first triangle and the second triangle form a parallelogram; and a distance between a first triangle vertex and the first triangle base side is equal to a distance between a second triangle vertex and the second triangle base side; and a plurality of carbon nanotube film preforms located between two adjacent patterned carbon nanotube arrays, each of the plurality of carbon nanotube film preforms directly pulled out from each of the plurality of patterned carbon nanotube arrays comprises a first end and a second end opposite to the first end; the first end of the each of the plurality of carbon nanotube film preforms is connected to the second triangle base side, and the second end of the each of the plurality of carbon nanotube film preforms is connected to the first triangle vertex angle; and pulling out a carbon nanotube film from the carbon nanotube structure preform, and a pulling direction is parallel to the X direction.

16. The method of claim 15, wherein each of the plurality of patterned carbon nanotube arrays further comprises a substrate, and the plurality of carbon nanotubes is substantially perpendicular to a surface of the substrate.

17. The method of claim 15, wherein the plurality of carbon nanotube film preforms comprises the plurality of carbon nanotubes joined end to end by van der Waals attractive force and extending along the X direction.

18. The method of claim 15, wherein the plurality of carbon nanotube film preforms is suspended.

19. The method of claim 15, wherein the first triangle and the second triangle are equilateral triangles.

20. The method of claim 15, wherein the number of the plurality of carbon nanotubes in the carbon nanotube film remains substantially unchanged in entire process of pulling.

* * * * *